United States Patent Office 3,293,321
Patented Dec. 20, 1966

3,293,321
AMINOPHENYL SULFIDES AS ANTIOZONANTS FOR RUBBER
Robert W. Layer, Cuyahoga Falls, Ohio, assignor to The B. F. Goodrich Company, New York, N.Y., a corporation of New York
No Drawing. Filed Nov. 18, 1963, Ser. No. 324,232
6 Claims. (Cl. 260—805)

This invention relates to the preservation of rubber and more particularly to the prevention of exposure cracking in rubber as caused by ozone.

A serious problem in the rubber industry is the protection of vulcanizates of sulfur-vulcanizable rubbers against exposure cracking or degradation of the vulcanizate from the effects of ozone while under static or dynamic tensile stress. The problem is particularly serious in respect to service life of tires which suffer severely from ozone-initiated cracking. Chemical additives have been known for many years to protect rubber against the effects of light, heat, oxygen and the like, but these materials, classed as antioxidants, have little effect against ozone attack on rubber.

I have discovered that the reaction products of aniline and sulfur heated together for 6 to 168 hours at 175° C. to 200° C., will, after unreacted aniline is removed, give excellent ozone protection to sulfur-vulcanizable rubbers under static and dynamic tension when combined with the rubber at the rate of 1.0 to 6.0, preferably 1.5 to 4.0, parts of antiozonant per hundred parts of rubber polymer. The aniline-sulfur reaction products are effective antiozonants either singly in the purified state or in the form of reaction mixtures of aniline thiols, mixed sulfides and disulfides. The amino groups may be in ortho or para position on the aromatic rings.

These new antiozonants conform to the structural formula:

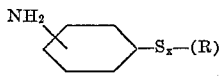

wherein the amino group is positioned ortho or para to the sulfur, $x$ is an integer from 1 to 7, R represents a member selected from the class consisting of hydrogen, and

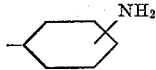

Mixtures of these aniline-sulfur reaction products are also useful as antiozonants.

The appearance of ozone cracking in rubber articles and samples is familiar to those skilled in the art. The cracks are short, run perpendicular to the direction of stress of the rubber and proliferate at great rate if the ozone concentration is very high—as in an ozone test chamber. Ozone occurs in the normal atmosphere in quantities of 0 to about 25 p.p.h.m., usually 7 to 9 p.p.h.m. in the summer months and 2 to 4 p.p.h.m. in the winter months. Even one p.p.h.m. will attack unprotected rubber items. The static test to which I have submitted samples containing my new antiozonants consists of mounting 3¾″ x 1″ x .075″ samples folded over end to end to form a single loop, clamped in a holder which is exposed to the atmosphere. Dynamic testing consists of mounting samples on a flex testing device of the type described in United States Patent 2,595,069, issued April 29, 1952, titled "Rotary Cylic Stress Testing Apparatus." In the particular device used, the wheels are 30″ in diameter, rotating at 300 r.p.m. Samples are 6″ long and at point of maximum flex measure 4⅜″ from end to end. At minimum flex, the samples measure 5⅞″ from end to end. In both static and dynamic tests, samples are evaluated for ozone cracking after exposure by placing them under a microscope at 15× magnification with a reticle in one eyepiece. A reticle unit is equivalent to 0.1 mm. A measure is made of mean crack length and mean crack width with the sample in a strained state comparable to that of maximum flex during the test run. With the reticle the length and width of 6 or more cracks is estimated. The product of length times width is directly proportional to the surface area of the open voids of the ozone cracks. This product of length times width is termed "severity of ozone cracking," abbreviated SOC. High SOC values indicate long, wide, deep cracks and represent severe damage by ozone. Low SOC values show greater resistance to ozone cracking.

The antiozonant compounds of this invention are useful in protecting sulfur-vulcanizable rubber against attacks by ozone. Various forms of protectable natural rubber include latex, crepe, smoked sheets, balata, guttapercha and cylo rubbers. Sulfur-vulcanizable synthetic rubberlike materials which may be protected include polymerized conjugated diene compounds made by polymerizing these materials alone or with another unsaturated monomer polymerizable therewith. Examples include polymers of butadiene, isoprene, piperylene, dimethyl butadiene, and the like alone or with unsaturated monoolefinic compounds which contain a $CH_2=C<$ group including styrene, alphamethyl styrene, chlorostyrenes, vinyl naphthalene, vinyl carbazole, vinyl alkyl, pyridines, acrylonitrile, methacrylonitrile, acrylic acid, methacrylic acid and the like.

The antiozonants of this invention are readily prepared by reacting an excess of aniline with sulfur at refluxing temperatures of 170° C. to 195° C. for 6 to 168 hours. Higher temperatures up to 250° C. and above may be used if the reactor is sealed to hold pressures up to 350 p.s.i.g. Mineral acid catalysts such as HCl may be employed to speed up the reaction. At the completion of the reaction, the excess aniline is preferably removed by steam distillation. The reaction product mixture is an oil which may be fractionated into thiophenols, diaminodiphenyl sulfides, diaminodiphenyl disulfides and higher diaminodiphenylpoly sulfides. The entire complex reaction mixture or any mixture of its components may also be employed as an antiozonant for sulfur-volcanizable rubbers in this invention.

To evaluate the antiozonant compositions of this invention, the following test recipes are employed:

| | A | B |
|---|---|---|
| SBR | | 100.0 |
| Oil extended SBR | [1] 125.0 | |
| Zinc oxide | 5.0 | |
| Stearic acid | 1.0 | 1.0 |
| Carbon black | 63.0 | 50.0 |
| Sulfur | 2.0 | 2.0 |
| N-cyclohexyl-2-benzothiazyl sulfenamide | 0.8 | 0.8 |
| Antiozonant | 0.0–3.0 | 0.0–3.0 |

[1] 100 parts rubber polymer; 25 parts oil.

The SBR used is a rosin acid, 41° F., ML 4 at 212° F.=46–58, sp. gr. 0.94 rubber supplied as Ameripol 1500 by Goodrich-Gulf Chemicals, Inc.

The oil-extended SBR is a styrene-butadiene copolymer containing 25 phr aromatic process oil, fatty acid/rosin acid, 43° F., ML 4 at 212° F.=50—65 rubber, supplied by Goodrich-Gulf Chemicals, Inc. Other commercial SBR polymers could also be used.

The ingredients are mixed on a rubber mill in the usual manner employed in the art. Press cures of 30′ to 60′ are employed to form ASTM sheets 6″ x 6″ x .060–0.75″.

The aniline-sulfur reaction products employed in this invention may be used as replacement for all or part of the standard antiozonant called for at the present by the compounders.

The following examples, in which parts are by weight unless otherwise indicated, are illustrative of my invention.

*Example I*

An aniline-sulfur reaction product is prepared by refluxing 1.1 mols aniline and 0.9 mol sulfur in a 500 ml. flask equipped with a condenser. The temperature is maintained at 180°–190° for 14 hours. Excess aniline is removed by steam distillation.

The product is analyzed in a Varian Model A–60 analytical NMR spectrometer using proton magnetic resonance spectroscopy and is found by comparison with known compound spectra to be a mixture of primarily o,o'-diaminodiphenyl sulfides and a minor amount of p,p'-diaminodiphenyl sulfides.

*Example II*

A mixture of 2.5 mols aniline and 1 mol sulfur is refluxed in a 500 ml. flask at 180° to 190° for 72 hours. The longer reaction period should encourage formation of a monosulfide product. Excess aniline is removed by steam distillation. When analyzed by gas chromatography using a 6 ft., 15% SE–30 on CHRW (60–80) column at a flow of 40 ml. per min. of helium, with the column temperature at 260° F. and cell bath at 370° F., very little di- and higher sulfides are found. The product is mixed o,o'- and p,p'-diaminodiphenylmonosulfides.

*Example III*

In a 500 ml. glass flask are mixed 2 mols aniline, 0.5 mol aniline hydrochloride and 1 mol sulfur. The reactants are refluxed 7 hours at 180° C.–197° C. Samples are taken for analysis at 4 hours and 7 hours. Excess aniline is removed by steam distallation.

refluxed at 180°–190° C. for 70 hours. Excess aniline is removed by steam distillation.

Mass spectrometer analysis of the product shows that 75% is p,p'-diaminodiphenylmonosulfide and 23% is p-aminothiophenol.

*Example V*

A number of aniline-sulfur reaction products and materials of similar chemical structure are tested for antiozonant activity in oil extended SBR by compounding them in recipe A, given above, curing 6" x 6" x 0.075" tensile sheets, and mounting cured 6" x 0.5" x 0.75" samples on the rotary flex machine as described above. The test samples contain 3.0 parts antiozonant per 100 parts rubber polymer. A control containing no antiozonant is run with each set of samples. Severity of ozone cracking (SOC) when the samples are examined at various intervals is set forth in the following table.

TABLE 1

| Antiozonant | Days sample exposed | |
|---|---|---|
| | 19 | 32 |
| | SOC | SOC |
| None (control) | 85.0 | 105.0 |
| Mixed o,o'- and p,p'-diaminodiphenylmonosulfides from Ex. II. (long reaction) | 7.3 | 19.4 |
| Mixed o,o'- and p,p'-diaminodiphenylmonosulfides from Ex. III. (short, catalyzed reaction) | 11.3 | 29.8 |
| Mixed p,p'-diaminodiphenylmonosulfide and p-aminothiophenol from Ex. IV | 8.5 | 19.5 |
| p,p'-Diamethylamino-diphenyldisulfide | 81.5 | 95.5 |

The mixtures of o,o'- and p,p'-diaminodiphenyl sulfides give excellent protection from ozone cracking to the oil-extended SBR. The p,p'-dimethylaminodiphenyldisulfide, which is quite similar in structure to the antiozonants of this invention, gives only slightly better protection than nothing at all. The presence of the side chain methyl groups appears to have great effect on antiozonant activity.

Similar tests run in oil-extended SBR with other candidate antiozonants are reported at different intervals with the results shown in Table 2.

TABLE 2

| Antiozonant | Days sample exposed | | | |
|---|---|---|---|---|
| | 14 | 28 | 48 | 55 |
| | SOC | SOC | SOC | SOC |
| None (control) | 37.9 | 84.9 | 127 | (²) |
| Mixed o,o'- and p,p'-diaminodiphenylsulfides from Ex. 1° | 1.2 | 11.8 | (¹) | 26.5 |
| o-Aminothiophenol | 10.3 | 27.4 | 38.2 | 53.5 |
| p-Aminothiophenol | 4.3 | 13.5 | 25.5 | 33.5 |
| 4,4'-Dithioaniline | 4.5 | 13.5 | 22.8 | 36.4 |
| Mixed o,o'- and p,p'-diaminodiphenylmonosulfides from Ex. II. (long reaction) | 8.8 | 23.2 | 51.6 | (¹) |
| p,p'-Diaminodiphenyl-disulfide | 5.7 | 14.8 | 25.5 | 47.4 |
| o,o'-Diaminodiphenyl-disulfide | 0.8 | 11.1 | 25.4 | 32.8 |
| N-isopropyl-N'-phenyl-p-phenylene diamine* | 3.7 | 13.2 | 19.5 | 30.8 |

¹ Not measured.
² Broken.
*A widely used antiozonant marketed by Naugatuck Chemical Co., Monsanto Chemical Co., and American Cyanamid Co.

Chromatographic analysis shows that the reaction is complete at 4 hours and the major products are monosulfides, mainly o,o-diaminodiphenylmonosulfide and p,p'-diaminodiphenylmonosulfide.

*Example IV*

In a three liter flask equipped with thermometer, condenser and stirrer, 9 mols aniline and 3 mols sulfur are The antiozonants of this invention are comparable to standard antiozonants used in the art.

*Example VI*

Various aniline-sulfur reaction products are compounded in the SBR recipe B given above at the rate of 3.0 parts antiozonant per hundred parts of rubber polymer and subjected to dynamic testing.

TABLE 3

| Antiozonant | Days sample exposed | | |
|---|---|---|---|
| | 13 | 27 | 38 |
| | SOC | SOC | SOC |
| None (control) | 57.0 | 99.0 | 137.0 |
| o-Aminothiophenol | 15.9 | 57.1 | 73.9 |
| p-Aminothiophenol | 1.8 | 8.3 | 15.2 |
| o,o'-Diaminodiphenyldisulfide | 22.7 | 46.3 | 66.9 |
| p,p'-Diaminodiphenyldisulfide | 2.7 | 10.5 | 21.6 |
| p,p'-Diaminodiphenylsulfide | 3.9 | 9.1 | 13.2 |
| Mixed o,o'- and p,p'-diaminodiphenyl-monosulfides from Ex. II (long reaction) | 7.8 | 23.1 | 29.1 |
| Mixed o,o'- and p,p'-diaminodiphenyl-monosulfides, from Ex. III (catalyzed reaction) | 16.5 | 36.8 | 54.0 |
| N,N'-di(1-methylheptyl)-p-phenylene diamine* | 4.4 | 6.6 | 13.1 |

*UOP 288, an antiozonant marketed by Universal Oil Products Company.

Example VII

Various aniline-sulfur reaction products are combined in oil extended SBR, recipe A, employing 1.5 parts of aniline-sulfur reaction product per hundred parts of rubber polymer with 1.5 parts of N,N'-di(1-methylheptyl)-p-phenylenediamine for a total of 3.0 parts of antiozonant. Control No. 1 contains no antiozonant at all; control No. 2 contains 3 parts N,N'-di(1-methylheptyl)-p-phenylene diamine.

TABLE 4

| Antiozonant | Days sample exposed | |
|---|---|---|
| | Dynamic Test, 10 | Static Test, 50 |
| | SOC | Remarks |
| Control No. 1 | 19.6 | Badly cracked. |
| Control No. 2 | 8.5 | No cracks. |
| p-Aminothiphenol | 1.9 | Do. |
| p,p'-Diaminodiphenyldisulfide | 2.1 | Do. |
| Mixed o,o'- and p,p-diaminodiphenyl-monosulfides from Ex. III | 2.5 | Do. |
| o,o'-Diaminodiphenyldisulfide | 2.6 | Do. |

The data in Table 4 indicates that various aniline-sulfur reaction products employed in the practice of this invention are compatible with known antiozonants and when mixed in equal parts with a known antiozonant give better protection against ozone in dynamic testing and equal protection in static testing when compared to the protection offered by the known antiozonant alone.

Any filling and compounding ingredients known in the art may be incorporated into the rubber base with these antiozonants. Other accelerators, softeners, lubricants and reinforcing agents than those shown in the typical recipes may be employed.

I claim:
1. A sulfur-vulcanizable natural rubber vulcanizate containing 1.0 to 6.0 parts per 100 parts of said vulcanizate by weight of an antiozonant compound of the structure

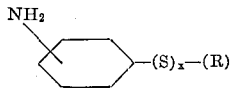

where $x$ is an integer from 1 to 2 and R represents a member of the class consisting of hydrogen, and

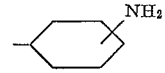

and mixtures of O,O'-diaminodiphenyl sulfide and p,p¹-diaminodiphenyl sulfide.

2. A sulfur-vulcanizable natural rubber vulcanizate containing 1.0 to 6.0 parts per 100 parts of said vulcanizate by weight of p-aminothiophenol as an antiozonant.

3. A sulfur-vulcanizable natural rubber vulcanizate containing 1.0 to 6.0 parts per 100 parts of said vulcanizate by weight of o,o'-diaminodiphenylsulfide as an antiozonant.

4. A sulfur-vulcanizable natural rubber vulcanizate containing 1.0 to 6.0 parts per 100 parts of said vulcanizate by weight of o,o'-diaminodiphenyldisulfide as an antiozonant.

5. A sulfur vulcanizable natural rubber vulcanizate containing 1.0 to 6.0 parts per 100 of said vulcanizate by weight of p,p'-diaminodiphenyldisulfide as an antiozonant.

6. A sulfur-vulcanizable natural rubber vulcanizate containing 1.0 to 6.0 parts per 100 parts of said vulcanizate by weight of an antiozonant compound selected from the group consisting of p-aminothiophenol, o,o'-diaminodiphenyl disulfide, p,p'-diaminodiphenyl disulfide, and mixtures of o,o'-diaminodiphenyl sulfide and p,p'-diaminodiphenyl sulfide.

References Cited by the Examiner

UNITED STATES PATENTS

| 2,435,508 | 2/1948 | Paul et al. | 260—578 |
| 3,156,728 | 11/1964 | Orloff et al. | 260—45.9 |
| 3,175,992 | 3/1965 | Anderson | 260—45.9 |

LEON J. BERCOVITZ, *Primary Examiner.*

DONALD E. CZAJA, *Examiner.*

H. E. TAYLOR, *Assistant Examiner.*